United States Patent [19]

Tanaka et al.

[11] 4,025,111
[45] May 24, 1977

[54] CHILD SAFETY SEAT WITH IMPROVED ABDOMINAL PAD ADJUSTMENT AND BUCKLE SECURING MEANS

[75] Inventors: Akira Tanaka, Northridge; Gregory G. Kuszynski, Pasadena, both of Calif.

[73] Assignee: American Safety Equipment Corporation, Encino, Calif.

[22] Filed: Aug. 28, 1975

[21] Appl. No.: 608,656

[52] U.S. Cl. .............................. 297/390; 297/216
[51] Int. Cl.² .................. A62B 35/00; B60R 21/10
[58] Field of Search .......... 297/250, 384, 390, 385, 297/389, 216, 254, 255, 256, 390; 24/230 A

[56] References Cited

UNITED STATES PATENTS

| | | | |
|---|---|---|---|
| 928,305 | 7/1909 | Carrington | 297/385 |
| 1,072,959 | 9/1913 | Kincannon | 297/385 X |
| 3,300,247 | 1/1967 | Marks | 297/385 |
| 3,563,600 | 2/1971 | Converse | 297/254 X |
| 3,698,046 | 1/1972 | Eubank | 24/230 A |
| 3,709,558 | 1/1973 | Jakob | 297/389 X |
| 3,767,259 | 10/1973 | Blake et al. | 297/250 |
| 3,790,994 | 2/1974 | Jakob | 24/230 A |
| 3,905,615 | 9/1975 | Schulman | 297/389 X |
| 3,910,634 | 10/1975 | Morris | 297/384 |

*Primary Examiner*—James T. McCall
*Attorney, Agent, or Firm*—Poms, Smith, Lande & Glenny

[57] ABSTRACT

The harness for securing a child into a child safety seat includes at least two webbing sections anchored to the seat and attached to an abdominal pad for restraining the upper torso of the child and locating the pad. The harness includes at least a third webbing section attached at one end to the abdominal pad. A tongue plate is attached to the other end of the third webbing section. Adjustment means are provided for adjusting the vertical position of the pad. The third harness has a fixed length, and the adjustment means comprises positioning means on or in the pad for positioning the first end of the third webbing section for vertically positioning the pad relative to the child. Securing means are also provided in the base of the seat for securing a buckle therein, and a slot in the seat allows for passage of the tongue plate through the slot. The buckle is secured in such a way that it is aligned with the slot so that the tongue plate mates with the buckle when the tongue plate passes through the slot.

18 Claims, 12 Drawing Figures

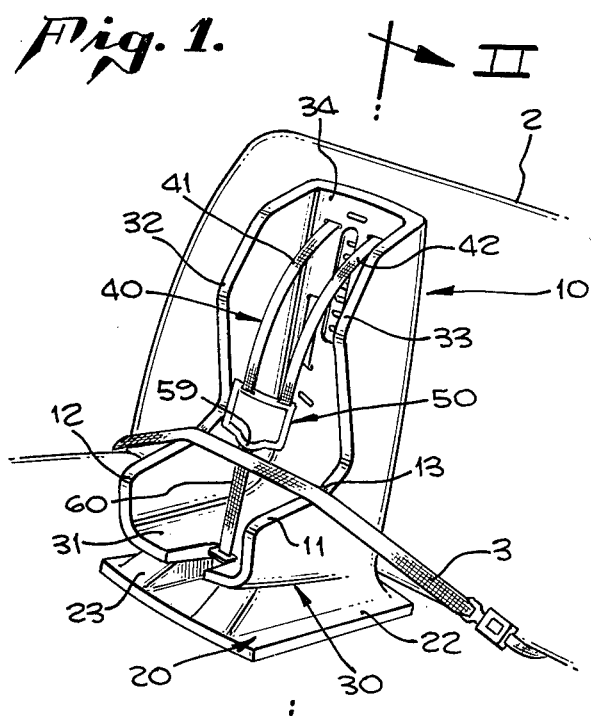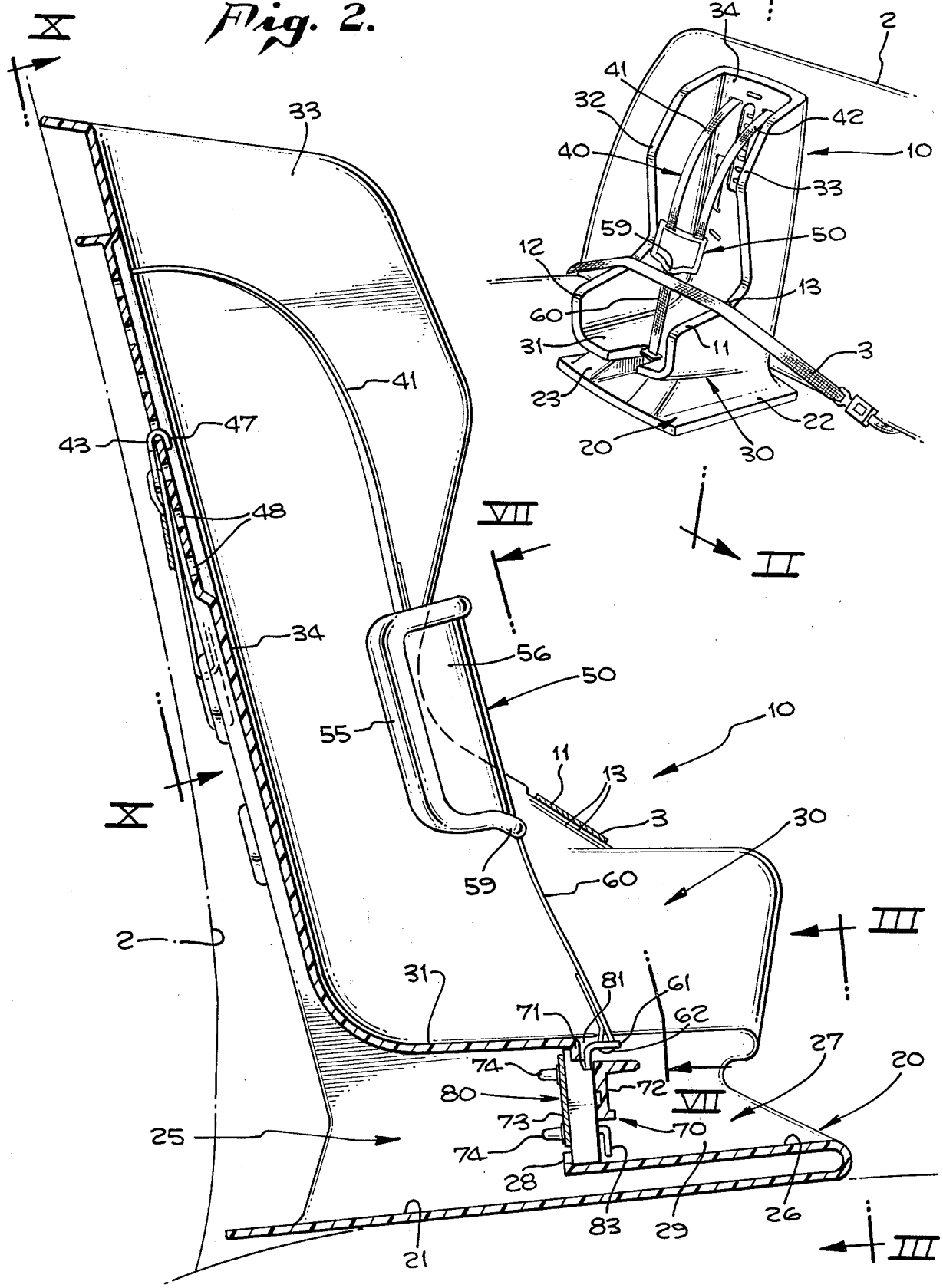

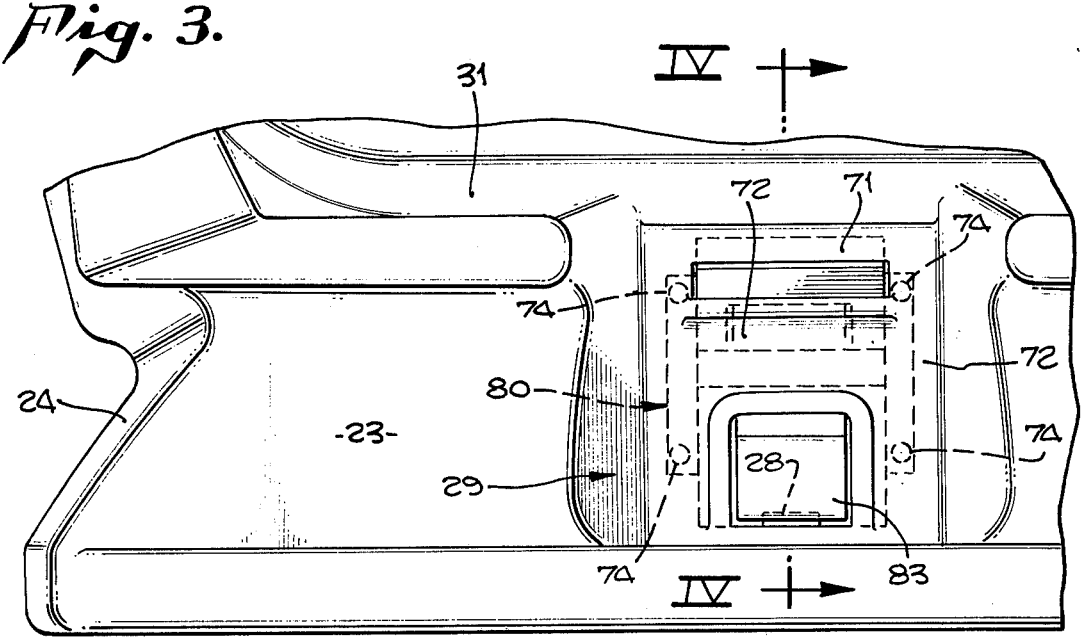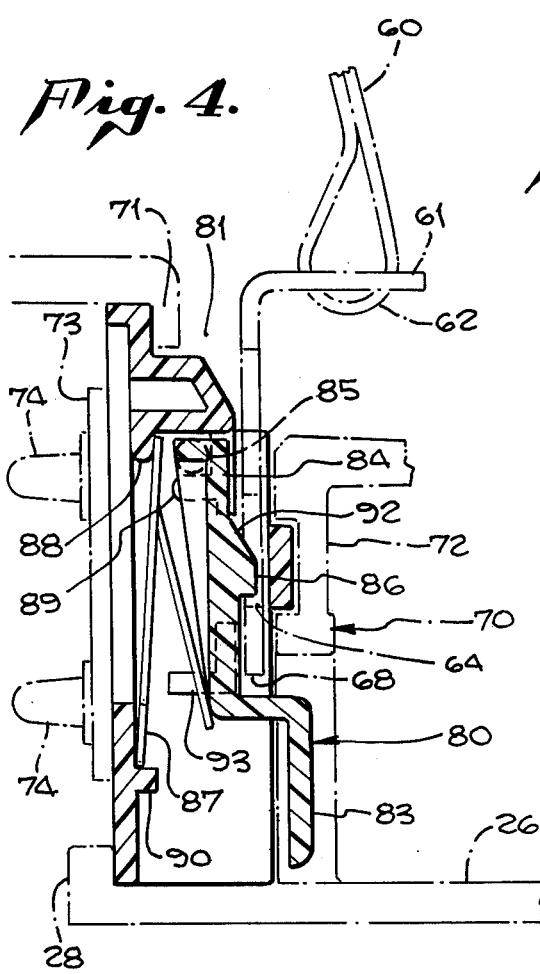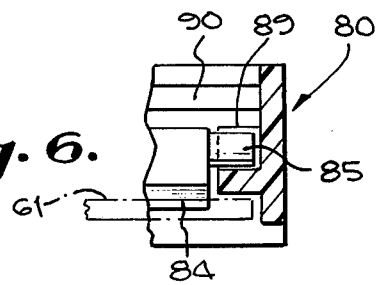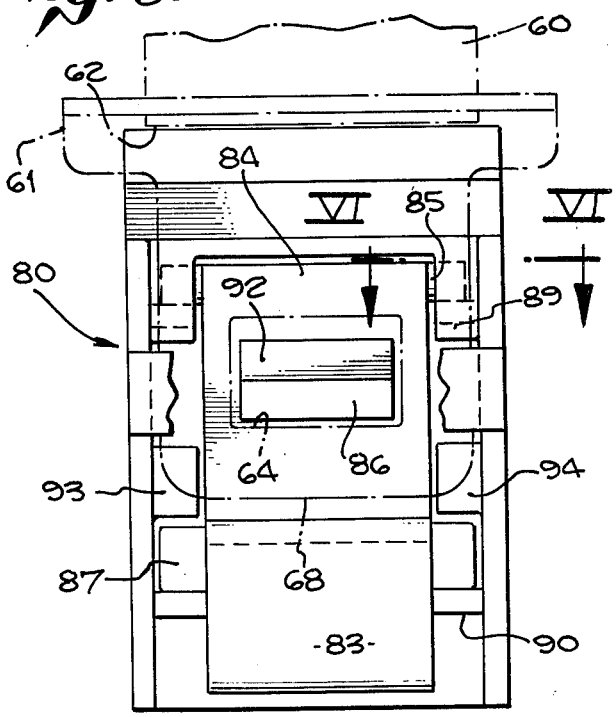

CHILD SAFETY SEAT WITH IMPROVED ABDOMINAL PAD ADJUSTMENT AND BUCKLE SECURING MEANS

BACKGROUND OF THE INVENTION

Because of the small size and weak bones of infants and young children, they cannot be protected from crashes while riding in vehicles by conventional vehicle safety equipment such as seat belts and the like. It had been common to provide auxiliary seating for young children vehicles but only recently with the increased emphasis on vehicle safety have child seats for vehicles been engineered with a primary goal of providing safety for the user child.

There have been child safety seats proposed which include a harness having an abdominal pad to absorb crash forces. See for example "ABDOMINAL RESTRAINT AND BELT STORAGE MEANS FOR CHILD SAFETY SEATS FOR VEHICLES," Ser. No. 472,079, filed May 22, 1974 to Tanaka. One problem associated with child safety seats in general and especially those having abdominal pads is the adjustment of the pads so that it fits the child seated in the child safety seat correctly.

It was recognized in "CHILD SAFETY SEAT FOR VEHICLES WITH HARNESS RELEASE INACCESSIBLE TO CHILD PASSENGER," to Henderson and Broughton, Ser. No. 471,465, filed May 20, 1974, that the harness should not be releasably buckled to the abdominal pad. This is because it may be possible for the child to release the buckle and eliminate his protection from the pad and harness. Therefore, a permanent connection between the harness webbing and the pad was proposed with the buckle located in an area beneath the seat so that it could not be reached by the child. One disadvantage of that system was upon unbuckling, the buckle would hang loose and it was a minor drawback to have to find the buckle in a slightly different location each time the child was to be strapped into the seat. However, even with this minor drawback, location of the buckle beneath the seat is considered advantageous.

Another minor drawback with the prior seats is that there was often excess webbing which increased the cost of the unit and also made more probable the chance of tangling webbing. Of course, with any child safety seat it may be necessary to extract the child rapidly therefrom, and any tangled webbing may interfere with rapid egress.

Therefore, one object of the present invention is to provide an improved child safety seat wherein the buckle is permanently located in a fixed position out of reach of a child sitting in the seat. Another object of the invention is to provide a harness for a child safety seat including an abdominal pad which utilizes the minimum amount of webbing while yielding the maximum amount of adjustability. By eliminating excess webbing, another object is met whereby storage means for excess webbing can be eliminated. It is an object of the invention to provide a child safety seat which the user parent can easily and quickly seat the child therein but in an emergency can rapidly extract the child therefrom. Another object of the invention is to provide an improved adjustment means for determining the position of the abdominal pad of the child safety seat. Another object of the invention is to meet the above objects at a low cost, minimizing the amount of webbing and hardware in the child safety seat and encouraging the use of plastic parts to make the child safety seat lightweight and easily transportable.

SUMMARY OF THE INVENTION

Adjustment means are provided for determining the position of an abdominal pad. At least one webbing segment is attached to one end of the pad and anchored at another end to a remote location. The adjustment means has been improved by the provision of having a bar which is mountable on mounting means on the pad at different vertically spaced locations thereon. Attaching means on one end of the webbing is provided for attaching it to the bar whereby changing the vertical position of the bar on the pad alters the length of the webbing protruding from the pad to position the pad vertically. The attaching means may comprise a loop on the webbing for receiving the bar within the loop. The pad may include vertically spaced ribs formed in the pad for receiving the bar between adjacent ribs whereby the rib receiving the bar determines the vertical position of the pad.

The harness includes a buckle plate or tongue plate attached to the webbing segment protruding from the pad, and the tongue plate is attachable to a buckle. Securing means in the base of the seat secures the buckle therein. A slot is provided in the seat for passage of the tongue plate therethrough, and the securing means aligns the buckle with the slot so that the tongue plate mates with the buckle when the tongue plate passes through the slot. A buckle retaining plate is provided to secure the buckle in the mating location. The base may include a rearward opening cavity with the securing means being formed therein so that the buckle may be inserted into the securing means through the rearward cavity. The securing means may comprise a flange extending parallel with the direction of insertion of the tongue plate into the buckle and from the periphery of the slot to absorb forces parallel to the flange on the buckle during a crash to prevent the buckle from being pulled through the seat structure. The securing means may further include a forward cavity in the base, and the buckle is mounted behind a wall in the cavity having an aperture through the wall. The aperture allows access to the buckle activator from the front of the seat.

BRIEF DESCRIPTION OF THE DRAWINGS

FIG. 1 is a perspective view of the child safety seat of the present invention mounted on a standard vehicle seat and attached thereto by means of a conventional waist seat belt.

FIG. 2 is a sectional view of the child safety seat of the present invention taken through the plane II—II of FIG. 1.

FIG. 3 is a front view of the front cavity which provides access to the actuator of the buckle and is taken along the plane III—III of FIG. 2.

FIG. 4 is a sectional view of the buckle and buckle plate received in the child safety seat securing means and is taken along the plane IV—IV in FIG. 3.

FIG. 5 is a front elevation showing the details in the securing means for the buckle in the base and is a projection of FIG. 4.

FIG. 6 is a sectional view taken through the plane VI—VI in FIG. 5 and shows more detail of the buckle.

DETAILED DESCRIPTION OF THE PREFERRED EMBODIMENT

The child Safety Seat Generally

Figure 7:
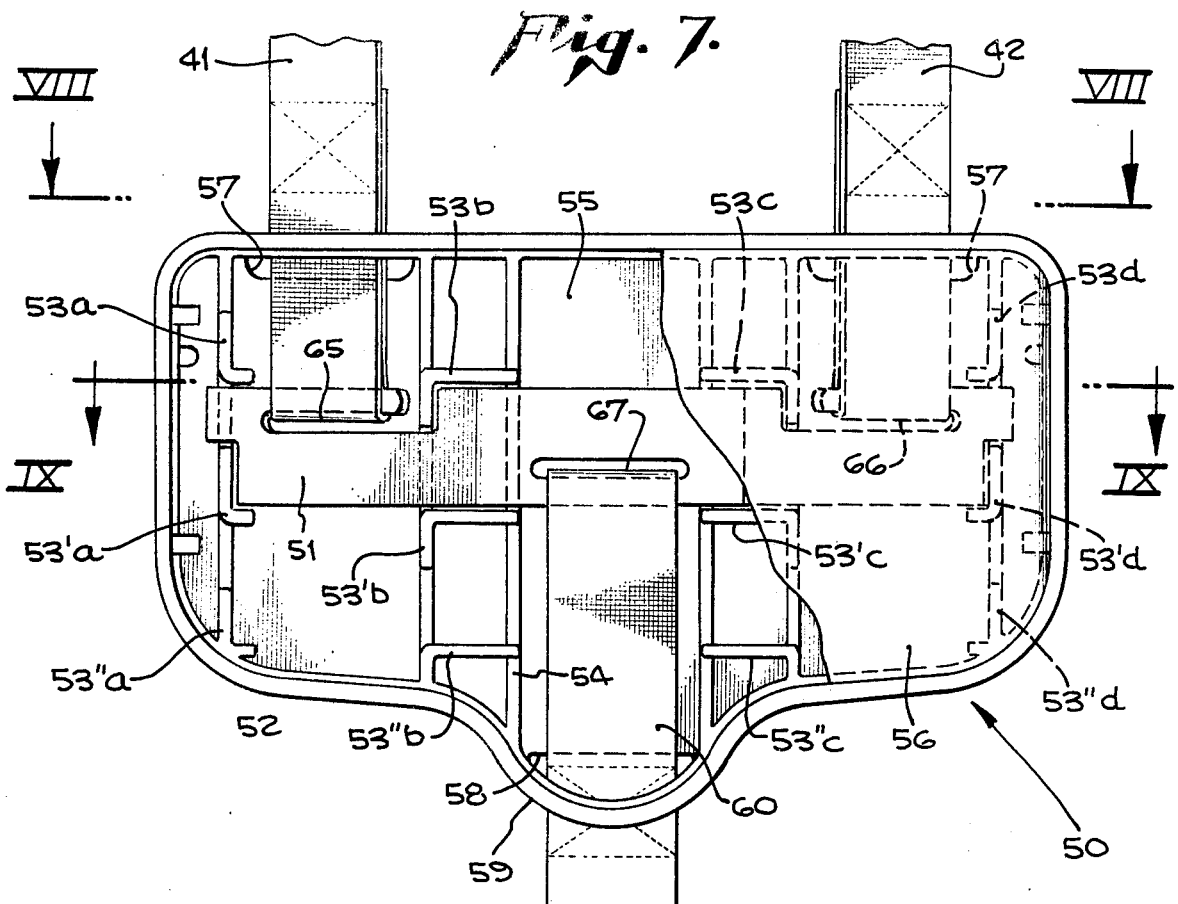
FIG. 7 is a front view, partially cut away showing the detail of the pad and the lower part of the harness, and is taken along the plane VII—VII in FIG. 2.

The child safety seat of the present invention is restrained within a vehicle in a manner discussed in U.S. Pat. application Ser. No. 471,457, filed May 20, 1974 to Henderson and Tanaka, entitled CHILD SAFETY SEAT FOR VEHICLES WITH IMPROVED SEAT BELT RESTRAINING MEANS. In the exemplary embodiment, seat 10 is anchored to the vehicle seat 2 by means of a conventional lap belt 3. Lap belt 3 is tightened about the load bearing surfaces 11 and 12, each of which has a plurality of grooves 13 to help prevent lateral movement of the child safety seat 10 relative to the lap belt 3.

The child safety seat includes a base 20 and a seating section 30. The base 20 is generally a pedestal in the exemplary embodiment, and includes a generally flat bottom plate 21 (FIG. 2) and upstanding sidewalls 22, 23 and 24. (FIGS. 1 and 3). The seating section 30 includes a seating surface 31, upstanding sidewalls 32 and 33 and a rear wall 34. (FIG. 1).

Figure 10:
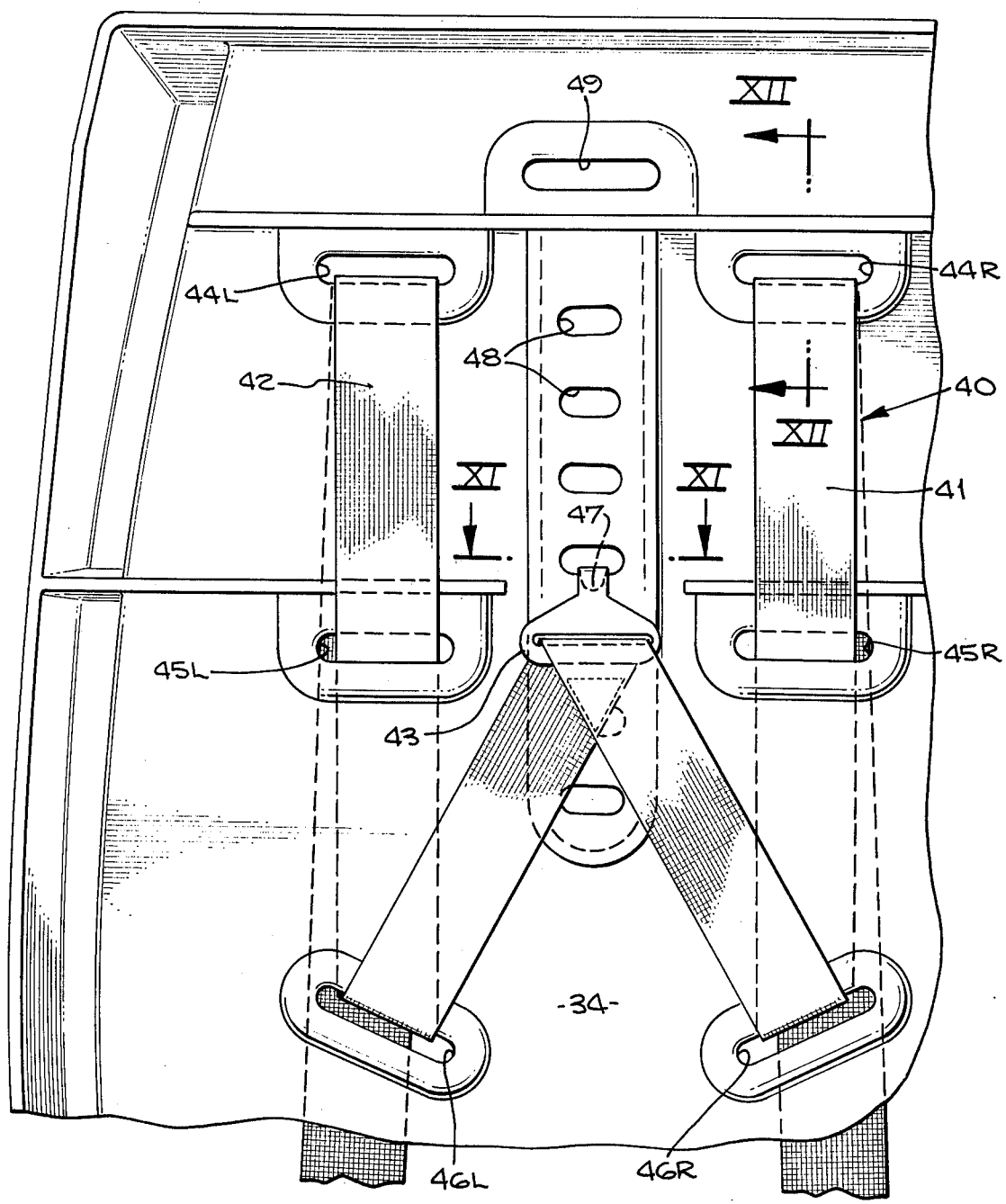
FIG. 10 is a partial rear view of the child safety seat showing adjustment means for adjusting the upper harness section.
Figure 11:
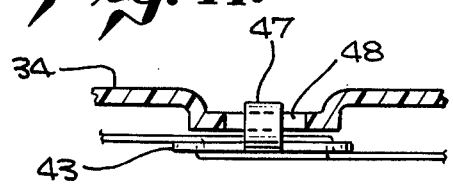
FIG. 11 is a sectional view showing slots for receiving the anchoring means and is taken along the plane XI—XI in FIG. 10.
Figure 12:
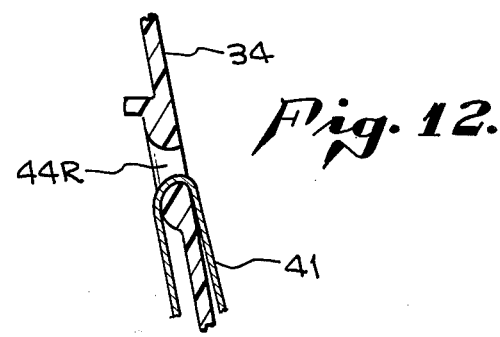
FIG. 12 is a sectional view showing the slots through which the belt passes and is taken along the plane XII—XII in FIG. 10.

In the exemplary embodiment, the child safety seat is formed of molded plastic which, as seen more clearly in FIG. 10, is open at the back so that the sidewalls 32 and 33 are generally hollow. Plastic is desirable because it can be molded to intricate shapes and because it is lightweight. A pad (not shown) covers the inside of the seat to make the seat comfortable and protective in a crash. The pad is preferably removable in a known manner.

The child safety seat of the present invention also includes a harness which is similar to the harness disclosed in U.S. application Ser. No. 471,457, supra, but which differs therefrom in many significant respects. The harness means of the present invention is shown in the exemplary embodiment at 40 (FIGS. 1, 2, 7) and includes at least two harness webbing sections 41 and 42 anchored to the seat. Although the means for anchoring the harness section 41 and 42 to the child safety seat are not a part of the present invention, such means are disclosed for clarity in interpreting the present specification. The connection of the harness is covered in a copending application to Tanaka and Ulrich, entitled "CHILD SAFETY SEAT HARNESS ANCHORING", filed Aug. 28, 1975, Ser. No. 608,657, which is incorporated herein by reference and from which a more complete description of the anchoring means can be obtained.

The webbing sections 41 and 42 are in actually one piece of webbing on which a hook plate or anchor plate 43 is mounted. (FIG. 10). The harness webbing sections 41 and 42 pass through slots in the rear wall 34 of the child safety seat. In the exemplary embodiment, webbing 41 passes through slot 44R and webbing section 42 passes through slot 44L. Slots 45L and 45R could also be used depending on the size of the child in the seat. After passing through slots 44L and 44R, the webbing is threaded back through slots 45L and 45R and then out through slots 46L and 46R, to angle toward the hook plate 43.

The hook plate has a hook 47 which fits into openings 48, and by the appropriate choice for an opening to receive the hook 47, the length of webbing protruding from the slots 44L and 44R can be determined. The hook 47 is of such a dimension that it cannot be removed or inserted into an opening 48 unless it is correctly oriented. (FIGS. 2, 13).

Slot 49 is adapted to receive a webbing section which is used to anchor the top portion of the child safety seat to a remote location, generally in the rear floor of the vehicle.

The two upper harness webbing sections 41 and 42 are attached at their other end to the abdominal pad 50, and a third harness webbing section is attached at one end to the abdominal pad. In the exemplary embodiment, particularly shown in FIGS. 1 and 2, the third or lower harness 60 is attached to abdominal pad 50. Attached at the lower end of the lower harness section 60 is a tongue plate or buckle plate 61 which is shown in the exemplary embodiment in FIGS. 2 and 7 and in more detail in FIGS. 4 and 5. As shown in FIG. 4, a sewn loop 62 of lower harness section 60 secures the tongue 61.

The tongue 61 is attachable to the buckle 80. (FIGS. 2, 3, 5, and in more detail in FIG. 4) The buckle and the associated means for mounting the buckle are discussed in more detail hereinafter. Briefly, however, the buckle 80 is secured by a securing means in the base, and a slot, which in the exemplary embodiment is indicated at 81 is provided in the seat for passage of the tongue 62 therethrough. The means that secure the buckle 80 aligns it with slot 81 so that the tongue 61 mates with the buckle when the tongue passes through the slot.

Positioning of the Abdominal Pad

Referring now more particularly to FIG. 7, it is noted that the third harness webbing section 60 is of a fixed length. This differs from the device disclosed in U.S. application Ser. No. 472,079 to Tanaka, filed May 22, 1974, and entitled ABDOMINAL RESTRAINT BELT STORAGE MEANS FOR CHILD SAFETY SEATS FOR VEHICLES, wherein the length of the webbing sections was adjustable, and the excess webbing was stored within the abdominal pad. It has been found that only minor adjustments are required for the position of the abdominal pad in different sized children. The only critical dimension is that the abdominal pad should be high enough to accommodate the child's thighs and low enough to secure the bottom part of his torso into the seat. It should be noted that the pad has a rounded lower portion 59 which rests between the child's legs.

Therefore, the adjustment means for adjusting the vertical position of the pad comprises in the preferred embodiment a bar 51 and mounting means 52 for mounting the bar at different vertically spaced locations on the pad. The mounting means includes vertically spaced rib means formed in the pad for receiving the bar 51 between adjacent ribs, and by determining the ribs which receive the bar, the vertical position of the pad is determined.

Figure 8:
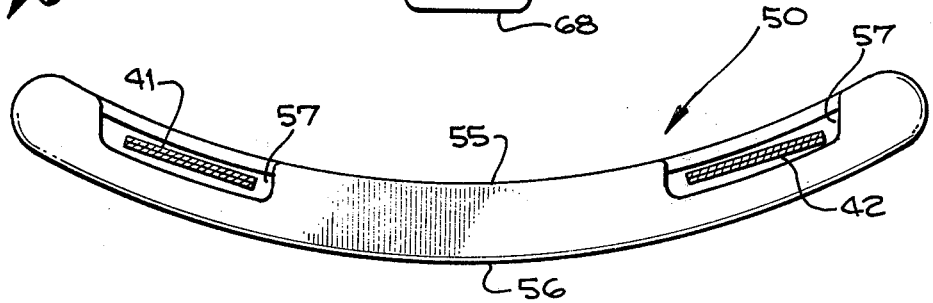
FIG. 8 is a top view of the pad taken along the plane VIII—VIII.
Figure 9:
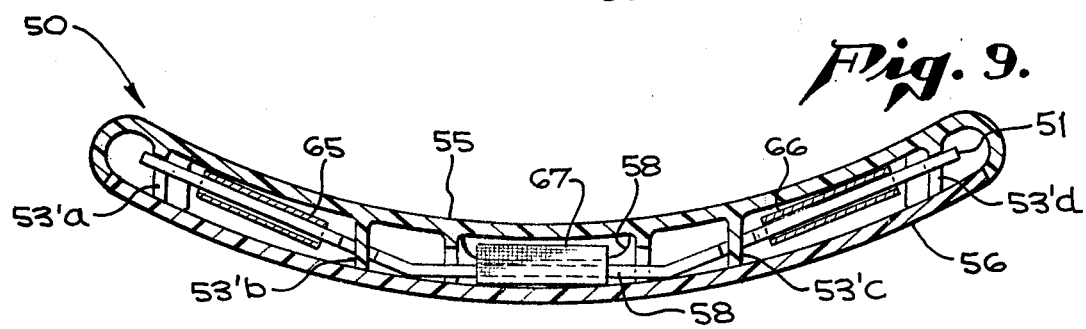
FIG. 9 is a sectional view of the pad taken along the plane IX—IX of the pad in FIG. 7.

Referring particularly to FIGS. 7, 8 and 9, in the exemplary embodiment, there are three sets of ribs 53, 53' and 53''. Each set of ribs comprise four rib sections 53a–53d, 53'a–53'd and 53''a–53''d. Bar 51 is shown being supported between ribs 53a–53d and 53'a–53'd of the mounting means 52. The bar 51 is snap fit between adjacent ribs and is so shaped that it fits between the rib sections (FIGS. 7 and 9).

The abdominal pad is formed of two sections, the first section or generally rear section is indicated in the preferred embodiment at 55 and the front section at 56. In the exemplary embodiment, the ribs 53 are formed in the rear wall 55 of the pad. Each of the harness webbing sections, 41, 42, and 60 has a loop 65, 66 and 67 respectively through which bar 51 can pass. Bar protrusions 54 also serves to divide the bar into sections for each webbing section. After the bar is fitted through the loops in the webbing, it is secured to the desired ribs. If a longer lower webbing section is desired, bar 51 can be placed between ribs 53e and 53f or between ribs 53d and 53e. This would position the abdominal pad at a higher level. If a lower level position for the abdominal pad were desired, it would be necessary to shortened the protrusion of webbing section 60. Therefore, the bar 51 would be placed between ribs 53a and 53b or 53b and 53c.

Each webbing section emerges from the rear plate of the abdominal pad through slots 57 for the upper harness and slot 58 for the lower harness. In order to make adjustments of the location of the bar, the front plate 56 is removable and is held in position against rear plate 55 in a snap fit arrangement. The resiliency of front and rear plates allows minor force to pry them apart.

Although adjusting the lower harness section does alter the length of upper harness sections 41 and 42 protruding from the abdominal pad, this minor adjustment can be compensated for by adjusting the anchoring position of the hook plate 43 to take up the excess slack in upper webbing harness sections 41 and 42. (FIG. 10).

Buckle and Means Securing the Buckle in the Seat Base

Securing means are provided in the base for securing the buckle therein. In the exemplary embodiment, the securing means indicated generally at 70 is emphasized generally in FIGS. 2 through 6. The securing means 70 includes a downwardly extending section 71 extending downward from the seat surface 31. As shown particularly in FIGS. 2 and 4, the top of buckle 80 abuts the downwardly extending section 71. Front section 72 abuts the front of the buckle. (FIG. 3). It can be seen in FIGS. 2 and 4 that the tongue 61 passes through slot 81 which is formed between downwardly extending section 71 and the front section 72. In the event of a crash or sudden stop, forces would be exerted on the belt 60 in an upward direction. The downwardly extending section 71 would bear the load from this force on buckle 80. Therefore, section 71 is a relatively thick section of the seating surface. Front section 72 absorbs any rotational force from the tongue and buckle.

The child safety seat is so designed that the buckle 80 is permanently held within the base of the seat, but provisions for its rare removal are provided. To secure the buckle 80 within the base of the seat, the buckle is pushed through the rear cavity 25 (FIG. 2) and the bottom of the buckle is pushed onto plate 26 which forms the bottom of the forward opening cavity 27. Bottom wall 26 has a tooth 28, and the assembler positions the bottom portion of the buckle 80 to the right (FIG. 2) of the tooth 28. Thereafter, by exerting a small force downward against the resiliency of the bottom wall 26, the buckle is pivoted until it is in the location shown in FIG. 2. The resiliency of the bottom wall 26 holds the buckle tightly against the downwardly extending section 71. The securing means 70 also includes a buckle securing plate 73 which is secured to the front section 72 by means of fastening means 74. Securing plate 73 holds the buckle in the location shown and prevents movements thereof in an emergency.

It should be recognized that front section 72 extends generally in front of the buckle. Front section 72 also closes off the front of rear cavity 25. An opening is provided through front section 72 through which the actuator 83 of the buckle can be reached. Other than the aperture to reach the actuator 83, the front section 72 mates with the walls 29 of forward cavity 27 to form a smooth continuous surface as shown more clearly in FIG. 3.

It can be seen that the buckle is located so as to prevent actuation by the child occupant which could result in a condition wherein without the child's parent's knowledge, the child unbuckles the harness so that it would offer him no protection at all. The present invention is an improvement in that the buckle is secured in one permanent location and the tongue is pushed through a slot in the seat. This will encourage easy use of the child safety seat.

The buckle 80 in the exemplary embodiment is constructed as follows. The plastic actuator button 83 is part of the latch member 84 which is pivoted at pivot 85 so that the latch 86 moves into and out of aperture 64 in the tongue plate 61. Spring 87 biases latch member 84 in the counterclockwise direction (FIG. 4).

When tongue plate 61 is inserted into the slot 81 and buckle 80, the leading edge 68 (FIG. 4) contacts the inclined edge 92 of latch 86. This pivots latch member 84 about pivot 85. Guides 93, 94 are provided to maintain latch member 84 aligned. After the latch 86 reaches aperture 64, the latch plate pivots to the FIG. 4 position under bias of spring 87 to secure tongue plate 61 in the buckle 80. When the actuator 83 is depressed, the latch 86 disengages tongue plate 61 to release it from buckle 80.

The buckle is easily assembled with pivot 85 being formed as an integral part of latch member 84; pivot 85 being insertable between members 88 and 89 of the housing of the buckle. Spring 87 is then inserted between member 88 and pivot 85 and extends to rest against member 90 to exert a force on latch member 84.

Thus, the invention meets the stated objects. It will be understood that various modifications and changes may be made in the configuration described above which may come within the spirit of this invention and all such changes and modifications coming within the scope of the appended claims are embraced thereby.

We claim:

1. In a child safety seat including a seating surface, a harness having shoulder strap means anchored to the child safety seat, an abdominal pad attached to said shoulder strap means, crotch strap means attached to said pad, and means to secure said crotch strap to said seat, the improvement comprising:

said crotch strap having a fixed length, adjustment means on said pad for adjusting the length of said crotch strap which projects from said pad, said means to secure said crotch strap to said seat includes a buckle plate on said crotch strap, a buckle below said seating surface and securing means provided in said seat for securing said buckle to said seat below said seating surface, slot means through said seating surface for passage of said buckle plate therethrough, said slot means being aligned with said buckle secured below said seating surface whereby insertion of said buckle plate through said slot connects said buckle and buckle plate together.

2. The improvement of claim 1 wherein said adjustment means includes attaching means on the end of said crotch strap opposite said buckle plate, and bar means attachable at different vertical locations within the pad and attached to said attaching means for adjustably vertically positioning said end of the crotch strap within the pad to adjust the length of said crotch strap projecting from the pad.

3. The improvement of claim 2, further comprising the provision of:

said attaching means comprising loop means formed of the crotch strap for receiving at least a portion of the bar within the loop.

4. The improvement of claim 2, further comprising the provision of:

said pad comprising vertically spaced rib means formed in the pad for receiving the bar means between adjacent rib means, the rib means receiving the bar means determining the length of crotch strap projecting from the pad.

5. In the child safety seat of claim 1 further including a base and a seating portion, above the base the improvement comprising:

a forward cavity in the base and aperture means in a wall of the cavity behind which wall is mounted said buckle, said aperture means allowing access to the buckle from the front of the seat.

6. In a child safety seat including a seat frame for supporting a child, harness means for securing the child to the seat frame, the harness means including at least two harness webbing sections anchored to the seat and attached to an abdominal pad for restraining the upper torso of the child and restraining the pad and at least a third harness webbing section anchored to the seat at a first end and attached at a second end to the abdominal pad for restraining the lower part of the torso and restraining the abdominal pad, and adjustment means for adjusting the vertical position of the pad, the improvement comprising the provision of:

said third harness webbing section having a fixed length, said adjustment means comprising positioning means associated with the pad for positioning the second end of the third harness webbing section for positioning the pad relative to the child.

7. In an adjustment means for determining the position of an abdominal pad of a child safety seat including at least one webbing segment attached at one end to the pad and anchored at another end to a remote location, the improvement comprising the provision of:

a bar and mounting means in the pad for mounting the bar at different vertically spaced locations in the pad, and attaching means on said one end of the webbing segment for attaching the one end of the webbing segment to the bar, whereby changing the vertical position of the bar in the pad alters the length of webbing protruding from the pad to position vertically the pad.

8. In a harness system for restraining a child occupant in a child safety seat including an abdominal pad and at least two sections of webbing extending generally upward from the pad to be anchored at a location remote from the pad to restrain the upper torso of the child and at least one section of webbing extending generally downward from the pad and anchored at a location remote from the pad for restraining the lower torso of the child, and adjustment means for adjusting the lengths of the webbing sections, the improvement comprising the provision of:

attaching means on the ends of the webbing sections at the pad and bar means attachable at different vertical loactions within the pad and attached to said attaching means for adjustably vertically positioning the ends of the webbing sections within the pad to adjust the vertical position of the pad.

9. The improvement of claim 8, further comprising the provision of:

said attaching means comprising loop means formed of the webbing for receiving at least a portion of the bar within the loop.

10. The improvement of claim 8, further comprising the provision of:

said pad comprising vertically spaced rib means formed in the pad for receiving the bar means between adjacent rib means, the rib means receiving the bar means determining the vertical position of the pad.

11. The improvement of claim 10, further comprising the provision of:

said bar means having projections extending therefrom, said rib means having cut-out means for receiving the projections for securing the bar means between the rib means.

12. In a child safety seat having a base and a seating surface, and harness means for securing the child to the seating surface, buckle plate means and buckle means for releasing the harness means to provide for ingress and egress of the child into the seat, said buckle means comprising a buckle housing, an aperture through one end of the buckle housing for inserting the buckle plate means therethrough into the buckle housing, latch means within the buckle housing for engaging the buckle plate means when the buckle plate means is inserted through the aperture, the improvement comprising the provision of:

securing means in the base for securing the buckle housing therein, slot means in the seat for passage of the buckle plate means therethrough, said securing means aligning the aperture with the slot means so that the buckle plate means mates with the aperture to engage the latch means when the buckle plate means passes through the slot means.

13. The improvement of claim 12 further comprising the provision of:

said base including a rearward opening cavity, said securing means being formed in said rearward cavity so that the means may be inserted into the securing means through the rearward cavity.

14. The improved securing means of claim 12 comprising flange means extending parallel with the direction of insertion of the buckle plate means into the buckle means and from the periphery of the slot to absorb forces parallel to the flange means on the buckle means during a crash to prevent the buckle means from being pulled through the structure of the seat.

15. The improved securing means of claim 14 comprising:
   rearward cavity closure means in the front portion of the rearward cavity for supporting the buckle means against forward movement in the rearward cavity.

16. The improved closure means of claim 15 comprising opening means for permitting access to the buckle release member from the front of the child safety seat.

17. The improved securing means of claim 12 including buckle retaining plate means behind the buckle means for holding the buckle means in its aligned location.

18. The improved securing means of claim 12 comprising:
   a forward cavity in the base and aperture means in a wall of the cavity behind which wall is mounted said buckle means, said aperture means allowing access to the buckle from the front of the seat.

* * * * *